United States Patent
Chen et al.

(10) Patent No.: US 7,781,547 B2
(45) Date of Patent: Aug. 24, 2010

(54) REACTOR SYSTEMS FOR USE IN POLYMERIZATION PROCESSES

(75) Inventors: Yuan-Ju (Ray) Chen, Houston, TX (US); Michael Francis McDonald, Kingwood, TX (US); Timothy Daniel Shaffer, Hackettstown, NJ (US); David Yen-Lung Chung, Bellaire, TX (US); Robert Norman Webb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 843 days.

(21) Appl. No.: 11/628,608

(22) PCT Filed: Jun. 25, 2004

(86) PCT No.: PCT/US2004/020574

§ 371 (c)(1), (2), (4) Date: Dec. 5, 2006

(87) PCT Pub. No.: WO2006/011868

PCT Pub. Date: Feb. 2, 2006

(65) Prior Publication Data

US 2008/0103272 A1 May 1, 2008

(51) Int. Cl.
*C08F 2/14* (2006.01)
*C08F 110/10* (2006.01)

(52) U.S. Cl. ............... 526/88; 526/206; 526/348.7; 526/919

(58) Field of Classification Search ............ 526/88, 526/206, 919, 348.7
See application file for complete search history.

(56) References Cited

U.S. PATENT DOCUMENTS

| 2,534,698 A | 12/1950 | Calfee et al. ............ 260/85.3 |
| 2,542,559 A | 2/1951 | Nelson et al. ............ 260/853 |
| 2,548,415 A | 4/1951 | Welch et al. ............ 260/85.3 |
| 2,644,809 A | 7/1953 | Saylor .................. 260/85.3 |
| 3,470,143 A | 9/1969 | Schrage et al. .......... 260/82.5 |
| 5,397,179 A | 3/1995 | Berlin et al. ............ 366/337 |
| 5,417,930 A | 5/1995 | McDonald, Jr. et al. ..... 422/131 |
| 5,527,870 A | 6/1996 | Maeda et al. ........... 526/348.7 |
| 5,624,878 A | 4/1997 | Devore et al. ............ 502/152 |
| 7,332,554 B2* | 2/2008 | Shaffer et al. ............ 526/335 |
| 2003/0199645 A1 | 10/2003 | Kendrick et al. ............ 526/64 |

(Continued)

FOREIGN PATENT DOCUMENTS

CA 2337003 1/2000

(Continued)

OTHER PUBLICATIONS

A, Berlin et al., The Macroscopic Kinetics of Rapid Processes of Polymerizatino in Turbulent Flows, Polym.-Plast. Technol. Eng., 30(2 & 3), 253-297 (1991).

(Continued)

*Primary Examiner*—Fred M Teskin
(74) *Attorney, Agent, or Firm*—Nancy T. Krawczyk; Leandro Arechederra, III (57) ABSTRACT

The invention relates to new polymerization processes using hydrofluorocarbons to produce polymers. In particular, the invention relates to new polymerization processes using turbulent flow reactor systems using diluents including one or more hydrofluorocarbon(s) to produce polymers.

41 Claims, 1 Drawing Sheet

U.S. PATENT DOCUMENTS

| | | | |
|---|---|---|---|
| 2004/0015029 A1 | 1/2004 | Lange et al. | 585/521 |
| 2004/0171772 A1 | 9/2004 | Huffer et al. | 526/64 |
| 2008/0081885 A1* | 4/2008 | Hagerty et al. | 526/64 |

FOREIGN PATENT DOCUMENTS

| | | |
|---|---|---|
| EP | 1026175 | 8/2000 |
| GB | 2181145 | 4/1987 |
| WO | WO 01/96421 | 12/2001 |
| WO | WO 02/34794 | 5/2002 |
| WO | WO 2004/058825 | 7/2004 |
| WO | WO 2004/058827 | 7/2004 |
| WO | WO 2004/058828 | 7/2004 |

OTHER PUBLICATIONS

B, Wunderlich, "The Nature of the Glass Transition and It's Determination by Thermal Analysis", in Assignment of the Glass Transition, ASTM STP 1249, R.J. Seyler, Ed., American Society for Testing and Materials, pp. 17-31, Philadelphia, (1994).

Cationic Polymerization of Olefins: A Critical Inventory, J.P. Kennedy, Wiley Interscience, New York, pp. 10-13 (1975).

Chemical and Engineering News, 63(5), 27 1985.

K. Matyjaszewski, ed. Cationic Polymerization, Marcel Dekker, Inc., New York, 1996.

Perry's Chemical Engineers Handbook, $7^{th}$ Edition, Editors R.H. Perry and D.W. Green, 1977, McGraw Hill.

Minsker et al., Plug-Flow Tubular Turbulent Reactors: A New Type of Industrial Apparatus, Theoretical Foundations of Chemical Engineering, vol. 35, No. 2, 162-167 (2001).

Organic Chemistry, Sixth Edition, Morrison and Boyd, Prentice-Hall, entitled "Ionic Polymerization. Living Polymers", pp. 1084-1085, (Englewood Cliffs New Jersey) 1992.

W.A. Thaler et al., entitled "High Molecular-Weight, High Unsaturation Copolymers of Isobutylene and Conjugated Dienes", 49(4) Rubber Chemical Technology, 960 (1976).

* cited by examiner

REACTOR SYSTEMS FOR USE IN POLYMERIZATION PROCESSES

CROSS REFERENCE TO RELATED APPLICATIONS

This application is a 371 National Stage Application of International Application No. PCT/2004/020574, filed Jun. 25, 2004, the disclosures of which are herein incorporated by reference in their entireties.

FIELD OF INVENTION

The invention relates to new polymerization processes using hydrofluorocarbons to produce polymers. In particular, the invention relates to new polymerization processes using turbulent flow reactor systems using diluents including hydrofluorocarbons to produce polymers.

BACKGROUND

Isoolefin polymers are prepared in carbocationic polymerization processes. Of special importance is butyl rubber which is a copolymer of isobutylene with a small amount of isoprene. Butyl rubber is made by low temperature cationic polymerization that generally requires that the isobutylene have a purity of >99.5 wt % and the isoprene have a purity of >98.0 wt % to prepare high molecular weight butyl rubber.

The carbocationic polymerization of isobutylene and its copolymerization with comonomers like isoprene is mechanistically complex. See, e.g., *Organic Chemistry*, SIXTH EDITION, Morrison and Boyd. Prentice-Hall, 1084-1085, Englewood Cliffs, N.J. 1992, and K. Matyjaszewski, ed, *Cationic Polymerizations*, Marcel Dekker, Inc., New York, 1996. The catalyst system is typically composed of two components: an initiator and a Lewis acid. Examples of Lewis acids include $AlCl_3$ and $BF_3$. Examples of initiators include Brønsted acids such as HCl, RCOOH (wherein R is an alkyl group), and $H_2O$. During the polymerization process, in what is generally referred to as the initiation step, isobutylene reacts with the Lewis acid/initiator pair to produce a carbenium ion. Following, additional monomer units add to the formed carbenium ion in what is generally called the propagation step. These steps typically take place in a diluent or solvent. Temperature, diluent polarity, and counterions affect the chemistry of propagation. Of these, the diluent is typically considered important.

Industry has generally accepted widespread use of a slurry polymerization process (to produce butyl rubber, polyisobutylene, etc.) in the diluent methyl chloride. Typically, the polymerization process extensively uses methyl chloride at low temperatures, generally lower than −90° C., as the diluent for the reaction mixture. Methyl chloride is employed for a variety of reasons, including that it dissolves the monomers and aluminum chloride catalyst but not the polymer product. Methyl chloride also has suitable freezing and boiling points to permit, respectively, low temperature polymerization and effective separation from the polymer and unreacted monomers. The slurry polymerization process in methyl chloride offers a number of additional advantages in that a polymer concentration of approximately 26% to 37% by volume in the reaction mixture can be achieved, as opposed to the concentration of only about 8% to 12% in solution polymerization. An acceptable relatively low viscosity of the polymerization mass is obtained enabling the heat of polymerization to be removed more effectively by surface heat exchange. Slurry polymerization processes in methyl chloride are used in the production of high molecular weight polyisobutylene and isobutylene-isoprene butyl rubber polymers. Likewise polymerizations of isobutylene and para-methylstyrene are also conducted using methyl chloride. Similarly, star-branched butyl rubber is also produced using methyl chloride.

However, there are a number of problems associated with the polymerization in methyl chloride, for example, the tendency of the polymer particles in the reactor to agglomerate with each other and to collect on the reactor wall, heat transfer surfaces, impeller(s), and the agitator(s)/pump(s). The rate of agglomeration increases rapidly as reaction temperature rises. Agglomerated particles tend to adhere to and grow and plate-out on all surfaces they contact, such as reactor discharge lines, as well as any heat transfer equipment being used to remove the exothermic heat of polymerization, which is critical since low temperature reaction conditions must be maintained.

The commercial reactors typically used to make these rubbers are well mixed vessels of greater than 10 to 30 liters in volume with a high circulation rate provided by a pump impeller. The polymerization and the pump both generate heat and, in order to keep the slurry cold, the reaction system needs to have the ability to remove the heat. An example of such a continuous flow stirred tank reactor ("CFSTR") is found in U.S. Pat. No. 5,417,930, incorporated by reference, hereinafter referred to in general as a "reactor" or "butyl reactor". In these reactors, slurry is circulated through tubes of a heat exchanger by a pump, while boiling ethylene on the shell side provides cooling, the slurry temperature being determined by the boiling ethylene temperature, the required heat flux and the overall resistance to heat transfer. On the slurry side, the heat exchanger surfaces progressively accumulate polymer, inhibiting heat transfer, which would tend to cause the slurry temperature to rise. This often limits the practical slurry concentration that can be used in most reactors from 26 to 37 volume % relative to the total volume of the slurry, diluent, and unreacted monomers. The subject of polymer accumulation has been addressed in several patents (such as U.S. Pat. No. 2,534,698, U.S. Pat. No. 2,548,415, U.S. Pat. No. 2,644,809). However, these patents have unsatisfactorily addressed the myriad of problems associated with polymer particle agglomeration for implementing a desired commercial process.

U.S. Pat. No. 2,534,698 discloses, inter alia, a polymerization process comprising the steps in combination of dispersing a mixture of isobutylene and a polyolefin having 4 to 14 carbon atoms per molecule, into a body of a fluorine substituted aliphatic hydrocarbon containing material without substantial solution therein, in the proportion of from one-half part to 10 parts of fluorine substituted aliphatic hydrocarbon having from one to five carbon atoms per molecule which is liquid at the polymerization temperature and polymerizing the dispersed mixture of isobutylene and polyolefin having four to fourteen carbon atoms per molecule at temperatures between −20° C. and −164° C. by the application thereto a Friedel-Crafts catalyst. However, '698 teaches that the suitable fluorocarbons would result in a biphasic system with the monomer, comonomer and catalyst being substantially insoluble in the fluorocarbon making their use difficult and unsatisfactory.

U.S. Pat. No. 2,548,415 discloses, inter alia, a continuous polymerization process for the preparation of a copolymer, the steps comprising continuously delivering to a polymerization reactors a stream consisting of a major proportion of isobutylene and a minor proportion isoprene; diluting the mixture with from ½ volume to 10 volumes of ethylidene difluoride; copolymerizing the mixture of isobutylene isoprene by the continuous addition to the reaction mixture of a liquid stream of previously prepared polymerization catalyst consisting of boron trifluoride in solution in ethylidene difluoride, maintaining the temperature between −40° C. and −103° C. throughout the entire copolymerization reaction . . . '415 teaches the use of boron trifluoride and its complexes as the Lewis acid catalyst and 1,1-difluoroethane as a preferred combination. This combination provides a system in which the catalyst, monomer and comonomer are all soluble and yet still affords a high degree of polymer insolubility to capture the benefits of reduced reactor fouling. However, boron trifluoride is not a preferred commercial catalyst for butyl polymers for a variety of reasons.

U.S. Pat. No. 2,644,809 teaches, inter alia, a polymerization process comprising the steps in combination of mixing together a major proportion of a monoolefin having 4 to 8, inclusive, carbon atoms per molecule, with a minor proportion of a multiolefin having from 4 to 14, inclusive, carbon atoms per molecule, and polymerizing the resulting mixture with a dissolved Friedel-Crafts catalyst, in the presence of from 1 to 10 volumes (computed upon the mixed olefins) of a liquid selected from the group consisting of dichlorodifluoromethane, dichloromethane, trichloromonofluormethane, dichloromonofluormethane, dichlorotetrafluorethane, and mixtures thereof, the monoolefin and multiolefin being dissolved in said liquid, and carrying out the polymerization at a temperature between −20° C. and the freezing point of the liquid. '809 discloses the utility of chlorofluorocarbons at maintaining ideal slurry characteristics and minimizing reactor fouling, but teaches the incorporation of diolefin (i.e. isoprene) by the addition of chlorofluorocarbons (CFC). CFC's are known to be ozone-depleting chemicals. Governmental regulations, however, tightly controls the manufacture and distribution of CFC's making these materials unattractive for commercial operation.

Additionally, Thaler, W. A., Buckley, Sr., D. J., *High Molecular-Weight, High Unsaturation Copolymers of Isobutylene and Conjugated Dienes,* 49(4) Rubber Chemical Technology, 960 (1976), discloses, inter alia, the cationic slurry polymerization of copolymers of isobutylene with isoprene (butyl rubber) and with cyclopentadiene in heptane.

In particular reference to certain reactor systems, background references include GB 2 181 145 A, Berlin et al., *The Macroscopic Kinetics of Rapid Processes of Polymerization in Turbulent Flows,* Polym.-Plast. Technol. Eng., 30(2 & 3), 253-297 (1991), Minsker et al., *Plug-Flow Tubular Turbulent Reactors: A New Type of Industrial Apparatus,* Theoretical Foundations of Chemical Engineering, Vol. 35, No. 2, 162-167 (2001), and U.S. Pat. No. 5,397,179. These references disclose, inter alia, polymerization processes applicable to what industry generally refers to as "jet reactors" or tubular turbulent reactors.

Such reactors have been tested in the past generally using chlorinated hydrocarbons. These polymerizations have been generally recognized in the art for their low conversion, low polymer yield, and/or large variations in molecular weight and molecular weight distribution in the polymer product. These attributes present a number of challenges associated with large scale, commercial implementation of such processes and reactor system designs.

For example, the monomer addition reactions (propagation and cross propagation) must be extremely rapid since many monomer additions (usually hundreds and more typically tens of thousands) must take place to form a single polymer molecular chain. In addition, the initiation kinetics for the polymerization must be extremely rapid so that the overall reaction time is short and the polymerization is uniform.

Additionally, a large exothermic heat of polymerization must be removed from the reaction mass during the short reaction time and this is often difficult to do when conducting polymerization reactions. For example, it is difficult to remove heat due to high viscosity of the reaction mass (particularly when the polymers are formed in solution). The high viscosity increases the overall heat transfer resistance of the reactor and tends to reduce the mixing and turbulence within the reactor making the polymer properties non-optimal. Moreover, it is difficult to remove heat due to reactor fouling (particularly when the polymers are formed as a slurry in a diluent or as a slurry in the monomers without diluent). The polymer fouling layer also increases the overall heat transfer resistance of the reactor and leads to plugging and non-uniform mixing and flows within the reactor.

Furthermore, temperatures within the reactor are difficult to control at a steady desired value due to the above two limiting factors. For polymerization reactions, control of temperature is usually essential since this affects not only the propagation kinetics (chain making reactions) but also the transfer and/or termination kinetics (chain breaking or stopping reactions). Therefore, molecular weight, molecular weight distributions co-monomer incorporation rates, etc. are all affected by temperature. In addition, the catalyst activity is usually affected by the reaction temperature.

Therefore, finding new polymerization processes and new reactor system designs using alternative diluents or blends of diluents to create new polymerization systems that would reduce particle agglomeration and/or reduce the amount of chlorinated hydrocarbons such as methyl chloride is desirable. Such new polymerization processes and reactor system designs would reduce particle agglomeration and reactor fouling without having to compromise process parameters, conditions, or components and/or without sacrificing productivity/throughput and/or the ability to produce high molecular weight polymers. Additionally, new polymerization processes and reactor systems designs using alternative diluents or blends of diluents would also desirably provide for less elaborate designs as compared to conventional systems and processes.

Hydrofluorocarbons (HFC's) are of interest because they are currently used as environmentally friendly refrigerants because they have a very low (even zero) ozone depletion potential. Their low ozone depletion potential is thought to be related to the lack of chlorine. The HFC's also typically have low flammability particularly as compared to hydrocarbons and chlorinated hydrocarbons.

Other background references include WO 02/34794 that discloses a free radical polymerization process using hydrofluorocarbons. Other background references include DE 100 61 727 A, WO 02/096964, WO 00/04061, U.S. Pat. No. 5,624,878, U.S. Pat. No. 5,527,870, and U.S. Pat. No. 3,470,143.

SUMMARY OF THE INVENTION

This invention provides new polymerization systems and processes using hydrofluorocarbons to produce polymers.

This invention also relates to polymerization processes comprising contacting one or more monomers, a catalyst system in the presence of a diluent comprising one or more hydrofluorocarbons (HFC's) in a reactor under polymerization conditions.

In particular, the invention provides for a polymerization process comprising contacting at least one first feed stream and at least one second feed stream at an effective contact time, the polymerization process comprising a diluent comprising one or more hydrofluorocarbon(s) (HFC's) in a reactor system.

The invention also provides for a polymerization process comprising contacting a catalyst system and at least one monomer at an effective contact time and at a flow velocity of from about 0.5 to about 400 m/s, wherein the polymerization process comprises a diluent comprising at least one hydrofluorocarbon (HFC).

In yet another embodiment, the invention provides for a polymerization process comprising contacting a catalyst system and one or monomer(s) in a microdroplet of a polymerization medium comprising one or more hydrofluorocarbon(s) (HFC's).

In any of the previous embodiments, the polymerization processes may be practiced with the use of a turbulent flow reactor systems having feed streams contacted at contact times herein disclosed.

DETAILED DESCRIPTION

Various specific embodiments, versions and examples of the invention will now be described, including preferred embodiments and definitions that are adopted herein for purposes of understanding the claimed invention. For determining infringement, the scope of the "invention" will refer to any one or more of the appended claims, including their equivalents, and elements or limitations that are equivalent to those that are recited.

For purposes of this invention and the claims thereto the term catalyst system refers to and includes any Lewis acid(s) or other metal complex(es) used to catalyze the polymerization of the olefinic monomers of the invention, as well as at least one initiator, and optionally other minor catalyst component(s).

In one embodiment, the invention provides a polymerization medium suitable to polymerize one or more monomer(s) to form a polymer, the polymerization medium comprising one or more Lewis acid(s), one or more initiator(s), and a diluent comprising one or more hydrofluorocarbon(s) (HFC's).

In another embodiment, the invention provides a polymerization medium suitable to polymerize one or more monomer(s) to form a polymer, the polymerization medium comprising one or more Lewis acid(s) and a diluent comprising one or more hydrofluorocarbon(s) (HFC); wherein the one or more Lewis acid(s) is not a compound represented by formula $MX_3$, where M is a group 13 metal and X is a halogen.

The phrase "suitable to polymerize monomers to form a polymer" relates to the selection of polymerization conditions and components, well within the ability of those skilled in the art necessary to obtain the production of a desired polymer in light of process parameters and component properties described herein. There are numerous permutations of the polymerization process and variations in the polymerization components available to produce the desired polymer attributes. In preferred embodiments, such polymers include polyisobutylene homopolymers, isobutylene-isoprene (butyl rubber) copolymers, isobutylene and para-methylstyrene copolymers, and star-branched butyl rubber terpolymers.

Diluent means a diluting or dissolving agent. Diluent is specifically defined to include chemicals that can act as solvents for the Lewis Acid, other metal complexes, initiators, monomers or other additives. In the practice of the invention, the diluent does not alter the general nature of the components of the polymerization medium, i.e., the components of the catalyst system, monomers, etc. However, it is recognized that interactions between the diluent and reactants may occur. In preferred embodiments, the diluent does not react with the catalyst system components, monomers, etc. to any appreciable extent. Additionally, the term diluent includes mixtures of at least two or more diluents.

A reactor is any container(s) in which a chemical reaction occurs.

A reactor system is any system including a reactor and all necessary and optional equipment used in the production of polymers.

A turbulent flow reactor system refers to a reactor system in which the monomer and catalyst system or catalyst system component feeds (collectively feeds or feed streams) are combined in a manner to facilitate mixing at flow rates necessary to generate the required turbulent mixing of the feed streams for a time, also known as the contact time, required to achieve reaction. In certain embodiments, a turbulent flow reactor system refers to a reactor system comprising a reactor in which the Reynolds number (Perry's Chemical Engineers Handbook ($7^{th}$ Edition), Editors R. H. Perry and D. W. Green, 1977, McGraw Hill) of the reaction stream is greater than 10,000, an indication of the nature of mixing present in the reaction stream.

The contact time is the time from when the feed streams combine to form the reaction stream to the time when the reaction stream contacts the quench thus terminating the reaction. An effective contact time refers to any period as previously defined and in accordance with the teachings of the polymerization processes and reactor systems herein disclosed. For the purposes of this invention, contact time and residence time are treated as equivalent terms.

Contact times useful for this invention include but are not limited to from less than 30 s, alternatively, from less than 20 s, alternatively, from less than 15 s, alternatively from less than 12 s, alternatively, from less than 10 s, alternatively, from less than 8 s, alternatively, from less than 5, alternatively from less than 3 s, alternatively, from less than 1 s, alternatively, from less than 0.1 s, alternatively, from less than 0.01 s and alternatively from less than 0.001 s.

In an embodiment, combination of the feed streams through the nozzles mounted in the injection head cause the formation of a fine spray of microdroplets. Microdroplet refers to a liquid particle with a diameter of about 0.4 to 1000 microns though particles of a larger size are not necessarily outside the scope of the current invention.

In certain embodiments, microdroplet refers to a liquid particle with a diameter of from about 0.4 to about 1000 microns; alternatively, microdroplet refers to a liquid particle with a diameter of from about 1 to about 900 microns; alternatively, microdroplet refers to a liquid particle with a diameter of from about 10 to about 800 microns; alternatively, microdroplet refers to a liquid particle with a diameter of from about 20 to about 600 microns; or, alternatively, microdroplet refers to a liquid particle with a diameter of from about 30 to about 400 microns.

In other embodiments, microdroplet refers to a liquid particle with a diameter of 1000 microns or less; alternatively, 600 microns or less; alternatively, 400 microns or less; alternatively, 100 microns or less; alternatively, 50 microns or less; alternatively, 40 microns or less; alternatively, 30 microns or less; alternatively, 10 microns or less; or alternatively, 1 micron or less.

In another embodiment, microdroplet refers to a liquid particle with a diameter of 1000 microns or greater.

Slurry refers to a volume of diluent comprising polymers that have precipitated from the diluent, monomers, and a catalyst system. The slurry concentration is the volume percent of the partially or completely precipitated polymers based on the total volume of the slurry.

As used herein, the new numbering scheme for the Periodic Table Groups are used as in CHEMICAL AND ENGINEERING NEWS, 63(5), 27 (1985).

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. Likewise, when catalyst components are described as comprising neutral stable forms of the components, it is well understood by one skilled in the art, that the ionic form of the component is the form that reacts with the monomers to produce polymers.

Isoolefin refers to any olefin monomer having two substitutions on the same carbon such as isobutylene.

Multiolefin refers to any monomer having two double bonds.

Isobutylene-based polymer refers to polymers comprising at least 80 mol % repeat units from isobutylene.

Elastomer or elastomeric composition refers to any polymer or composition of polymers consistent with the ASTM D1566 definition. The terms may be used interchangeably with the term "rubber(s)", as used herein.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

In one embodiment, this invention relates to the use of hydrofluorocarbon(s) or blends of hydrofluorocarbon(s) with hydrocarbon(s) and/or chlorinated hydrocarbon(s) to produce a polymer slurry which is less prone to fouling (i.e., also observed more glass like, less sticky particles in the reaction vessel with reduced adherence to the walls of the vessel or to the stirring impeller as well as reduced particle to particle agglomeration). More particularly, this invention relates to the use of hydrofluorocarbon diluent(s) or HFC diluent blends with hydrocarbons and/or chlorinated hydrocarbon blends to polymerize and copolymerize isoolefins with dienes and/or alkylstyrenes to produce isoolefin homopolymers and copolymers with significantly reduced reactor fouling. Further, this invention relates to the use of hydrofluorocarbon diluent(s) or diluent blends with hydrocarbons and/or chlorinated hydrocarbon blends to polymerize and copolymerize isoolefins with dienes to produce isoolefin copolymers with significantly reduced reactor fouling and hence longer run life for the reactors, as compared to conventional systems.

In one embodiment, this invention relates to the discovery of new polymerization systems using diluents containing hydrofluorocarbons. These diluents effectively dissolve the selected catalyst system and monomers but are relatively poor solvents for the polymer product. Polymerization systems using these diluents are less prone to fouling due to the agglomeration of polymer particles to each other and their depositing on polymerization hardware. In addition, this invention further relates to the use of these diluents in polymerization systems for the preparation of high molecular weight polymers and copolymers at equivalent to or higher than to those polymerization temperatures using solely chlorinated hydrocarbon diluents such as methyl chloride.

In another embodiment, this invention relates to the discovery of new polymerization systems using fluorinated aliphatic hydrocarbons capable of dissolving the catalyst system. These polymerization systems are also beneficial for isoolefin slurry polymerization and production of a polymer slurry that is less prone to fouling, while permitting dissolution of monomer, comonomer and the commercially preferred alkylaluminum halide catalysts. In addition, this invention further relates to the use of these diluents for the preparation of high molecular weight polymers and copolymers at higher polymerization temperatures as compared to polymerization systems using solely chlorinated hydrocarbon diluents such as methyl chloride.

In yet another embodiment, this invention relates to the preparation of isoolefinic homopolymers and copolymers, especially the polymerization reactions required to produce the isobutylene-isoprene form of butyl rubber and isobutylene-p-alkylstyrene copolymers. More particularly, the invention relates to a method of polymerizing and copolymerizing isoolefins in a slurry polymerization process using hydrofluorocarbon diluents or blends of hydrofluorocarbons, and chlorinated hydrocarbon diluents, like methyl chloride.

In another embodiment, the polymerization systems of the present invention provide for copolymerizing an isomonoolefin having from 4 to 7 carbon atoms and para-alkylstyrene monomers. In accordance with a preferred embodiment of the invention, the system produces copolymers containing between about 80 and 99.5 wt. % of the isoolefin such as isobutylene and between about 0.5 and 20 wt. % of the para-alkylstyrene such as para-methylstyrene. In accordance with another embodiment, however, where glassy or plastic materials are being produced as well, the copolymers are comprised between about 10 and 99.5 wt. % of the isoolefin, or isobutylene, and about 0.5 and 90 wt. % of the para-alkylstyrene, such as para-methylstyrene.

In a preferred embodiment this invention relates to a process to produce polymers of cationically polymerizable monomer(s) comprising contacting, in a reactor, the monomer(s), a Lewis acid, and an initiator, in the presence of an HFC diluent at a temperature of 0° C. or lower, preferably −10° C. or lower, preferably −20° C. or lower, preferably −30° C. or lower, preferably −40° C. or lower, preferably −50° C. or lower, preferably −60° C. or lower, preferably −70° C. or lower, preferably −80° C. or lower, preferably −90° C. or lower, preferably −100° C. or lower, preferably from 0° C. to the freezing point of the polymerization medium, such as the diluent and monomer mixture.

Monomers and Polymers

Monomers which may be polymerized by this system include any hydrocarbon monomer that is polymerizable using this invention. Preferred monomers include one or more of olefins, alpha-olefins, disubstituted olefins, isoolefins, conjugated dienes, non-conjugated dienes, styrenics and/or substituted styrenics and vinyl ethers. The styrenic may be substituted (or the ring) with an alkyl, aryl, halide or alkoxide group. Preferably, the monomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, β-pinene, myrcene, 6,6-dimethyl-fulvene, hexadiene, cyclopentadiene, piperylene, methyl vinyl ether, ethyl vinyl ether, and isobutyl vinyl ether and the like. Monomer may also be combinations of two or more monomers. Styrenic block copolymers may also be used a monomers. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include 1) isobutylene and para-methyl styrene 2) isobutylene and isoprene, as. well as homopolymers of isobutylene.

Additionally, preferred monomers include those that are cationically polymerizable as described in *Cationic Polymerization of Olefins, A Critical Inventory*, Joseph Kennedy, Wiley Interscience, New York 1975. Monomers include any monomer that is cationically polymerizable, such as those monomers that are capable of stabilizing a cation or propagating center because the monomer contains an electron donating group. For a detailed discussion of cationic catalysis please see *Cationic Polymerization of Olefins, A Critical Inventory*, Joseph Kennedy, Wiley Interscience, New York 1975.

The monomers may be present in the polymerization medium in an amount ranging from 75 wt % to 0.01 wt % in one embodiment, alternatively 60 wt % to 0.1 wt %, alternatively from 40 wt % to 0.2 wt %, alternatively 30 to 0.5 wt %, alternatively 20 wt % to 0.8 wt %, alternatively and from 15 wt % to 1 wt % in another embodiment.

Preferred polymers include homopolymers of any of the monomers listed in this Section. Examples of homopolymers include polyisobutylene, polypara-methylstyrene, polyisoprene, polystyrene, polyalpha-methylstyrene, polyvinyl ethers (such as polymethylvinylether, polyethylvinylether).

Preferred polymers also include copolymers of 1) isobutylene and an alkylstyrene; and 2) isobutylene and isoprene.

In one embodiment butyl polymers are prepared by reacting a comonomer mixture, the mixture having at least (1) a $C_4$ to $C_6$ isoolefin monomer component such as isobutene with (2) a multiolefin, or conjugated diene monomer component. The isoolefin is in a range from 70 to 99.5 wt % by weight of the total comonomer mixture in one embodiment, 85 to 99.5 wt % in another embodiment. In yet another embodiment the isoolefin is in the range of 92 to 99.5 wt %. The conjugated diene component in one embodiment is present in the comonomer mixture from 30 to 0.5 wt % in one embodiment, and from 15 to 0.5 wt % in another embodiment. In yet another embodiment, from 8 to 0.5 wt % of the comonomer mixture is conjugated diene. The $C_4$ to $C_6$ isoolefin may be one or more of isobutene, 2-methyl-1-butene, 3-methyl-1-butene, 2-methyl-2-butene, and 4-methyl-1-pentene. The multiolefin may be a $C_4$ to $C_{14}$ conjugated diene such as isoprene, butadiene, 2,3-dimethyl-1,3-butadiene, β-pinene, myrcene, 6,6-dimethyl-fulvene, hexadiene, cyclopentadiene and piperylene. One embodiment of the butyl rubber polymer of the invention is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment. The following table illustrates how the above-referenced wt % would be expressed as mol %.

| Wt % IC4[a] | mol % IC4 | wt % IC5[b] | Mol % IC5 |
|---|---|---|---|
| 70 | 73.9 | .5 | .4 |
| 85 | 87.3 | 5 | 4.2 |
| 92 | 93.3 | 8 | 6.7 |
| 95 | 95.9 | 15 | 12.7 |
| 99.5 | 99.6 | 30 | 26.1 |

[a]IC4-isobutylene
[b]IC5-isoprene

This invention further relates to terpolymers and tetrapolymers comprising any combination of the monomers listed above. Preferred terpolymers and tetrapolymers include polymers comprising isobutylene, isoprene and divinylbenzene, polymers comprising isobutylene, para-alkylstyrene (preferably paramethyl styrene) and isoprene, polymers comprising cyclopentadiene, isobutylene, and paraalkyl styrene (preferably paramethyl styrene), polymers of isobutylene cyclopentadiene and isoprene, polymers comprising cyclopentadiene, isobutylene, and methyl cyclopentadiene, polymers comprising isobutylene, paramethylstyrene and cyclopentadiene.

Lewis Acid

The Lewis acid (also referred to as the co-initiator or catalyst) may be any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. One skilled in the art will recognize that some elements are better suited in the practice of the invention. In one embodiment, the metals are aluminum, boron and titanium, with aluminum being desirable. Illustrative examples include $AlCl_3$, $(alkyl)AlCl_2$, $(C_2H_5)_2AlCl$ and $(C_2H_5)_3Al_2Cl_3$, $BF_3$, $SnCl_4$, $TiCl_4$.

Additionally, Lewis acids may be any of those useful in cationic polymerization of isobutylene copolymers including: aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred.

Lewis acids such as methylaluminoxane (MAO) and specifically designed weakly coordinating Lewis acids such as $B(C_6F_5)_3$ are also suitable Lewis acids within the context of the invention.

As one skilled in the art will recognize the aforementioned listing of Lewis acids is not exhaustive and is provided for illustration. For a more information regarding Lewis acids in polymerization processes, see, for example, International Application Nos. PCT/US03/40903 and PCT/US03/40340.

Initiator

Initiators useful in this invention are those initiators which are capable of being complexed in a suitable diluent with the chosen Lewis acid to yield a complex which rapidly reacts with the olefin thereby forming a propagating polymer chain. Illustrative examples include Brønsted acids such as $H_2O$, HCl, RCOOH (wherein R is an alkyl group), and alkyl halides, such as $(CH_3)_3CCl$, $C_6H_5C(CH_3)_2Cl$ and (2-Chloro-2,4,4-trimethylpentane). More recently, transition metal complexes, such as metallocenes and other such materials that can act as single site catalyst systems, such as when activated with weakly coordinating Lewis acids or Lewis acid salts have been used to initiate isobutylene polymerization.

In an embodiment, the initiator comprises one or more of a hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, or arylalkylacid halide.

As one skilled in the art will recognize the aforementioned listing of initiator(s) is not exhaustive and is provided for illustration. For a more information regarding initiator(s) in polymerization processes, see, for example, International Application Nos. PCT/US03/40903 and PCT/US03/40340.

Hydrofluorocarbons

Hydrofluorocarbons are preferably used as diluents in the present invention, alone or in combination with other hydrofluorocarbons or in combination with other diluents. For purposes of this invention and the claims thereto, hydrofluorocarbons ("HFC's" or "HFC") are defined to be saturated or unsaturated compounds consisting essentially of hydrogen, carbon and fluorine, provided that at least one carbon, at least one hydrogen and at least one fluorine are present.

In certain embodiments, the diluent comprises hydrofluorocarbons represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y and z are integers and at least one.

Illustrative examples include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,3,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof and including mixtures of unsaturated HFC's described below. Particularly preferred HFC's include difluoromethane, trifluoromethane, 1,1-difluoroethane, 1,1,1-trifluoroethane, fluoromethane, and 1,1,1,2-tetrafluoroethane.

Illustrative examples of unsaturated hydrofluorocarbons include vinyl fluoride; 1,1-difluoroethene; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1- butene; 1,3-difluoropropene; 1,4-difluoro-1-butene; 2,3-difluoro-1-butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene; 1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluoro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures of saturated HFC's described above.

In one embodiment, the diluent comprises non-perfluorinated compounds or the diluent is a non-perfluorinated diluent. Perfluorinated compounds being those compounds consisting of carbon and fluorine. However, in another embodiment, when the diluent comprises a blend, the blend may comprise perfluorinated compound, preferably, the catalyst, monomer, and diluent are present in a single phase or the aforementioned components are miscible with the diluent as described in further detail below. In another embodiment, the blend may also comprise chlorofluorocarbons (CFC's), or those compounds consisting of chlorine, fluorine, and carbon.

In another embodiment, when higher weight average molecular weights (Mw) (typically greater than 10,000 Mw, preferably more than 50,000 Mw, more preferably more than 100,000 Mw) are desired, suitable diluents include hydrofluorocarbons with a dielectric constant of greater than 10 at −85° C., preferably greater than 15, more preferably greater than 20, more preferably greater than 25, more preferably 40 or more. In embodiments where lower molecular weights (typically lower than 10,000 Mw, preferably less than 5,000 Mw, more preferably less than 3,000 Mw) are desired the dielectric constant may be less than 10, or by adding larger amounts of initiator or transfer agent when the dielectric constant is above 10. The dielectric constant of the diluent $\in_D$ is determined from measurements of the capacitance of a parallel-plate capacitor immersed in the diluent [measured value $C_D$], in a reference fluid of known dielectric constant $\in_R$ [measured value $C_R$], and in air ($\in_A=1$) [measured value $C_A$]. In each case the measured capacitance $C_M$ is given by $C_M=\in C_C+C_S$, where $\in$ is the dielectric constant of the fluid in which the capacitor is immersed, $C_C$ is the cell capacitance, and $C_S$ is the stray capacitance. From these measurements $\in_D$ is given by the formula $\in_D=((C_D-C_A)\in_R+(C_R-C_D))/(C_R-C_A)$. Alternatively, a purpose-built instrument such as the Brookhaven Instrument Corporation BIC-870 may be used to measure dielectric constant of diluents directly. A comparison of the dielectric constants ($\in$) of a few selected diluents at −85° C. is provided below.

| Diluent | $\epsilon$ at −85° C. |
|---|---|
| Methyl chloride | 18.34 |
| Difluoromethane | 36.29 |
| 1,1-difluoroethane | 29.33 |
| 1,1,1-trifluoroethane | 22.18 |
| 1,1,1,2-tetrafluoroethane | 23.25 |
| 1,1,2,2-tetrafluoroethane | 11.27 |
| 1,1,1,2,2-pentafluoroethane | 11.83 |

In other embodiments, one or more HFC's are used in combination with another diluent or mixtures of diluents. Suitable additional diluents include hydrocarbons, especially hexanes and heptanes, halogenated hydrocarbons, especially chlorinated hydrocarbons and the like. Specific examples include but are not limited to propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and the halogenated versions of all of the above, preferably the chlorinated versions of the above, more preferably fluorinated versions of all of the above. Brominated versions of the above are also useful. Specific examples include, methyl chloride, methylene chloride, ethyl chloride, propyl chloride, butyl chloride, chloroform and the like.

In another embodiment, non-reactive olefins may be used as diluents in combination with HFC's. Examples include, but are not limited to, ethylene, propylene, and the like.

In one embodiment, the HFC is used in combination with a chlorinated hydrocarbon such as methyl chloride. Additional embodiments include using the HFC in combination with hexanes or methyl chloride and hexanes. In another embodiment the HFC's are used in combination with one or more gases inert to the polymerization such as carbon dioxide, nitrogen, hydrogen, argon, neon, helium, krypton, zenon, and/or other inert gases that are preferably liquid at entry to the reactor. Preferred gases include carbon dioxide and/or nitrogen.

In another embodiment the HFC's are used in combination with one or more nitrated alkanes, including $C_1$ to $C_{40}$ nitrated linear, cyclic or branched alkanes. Preferred nitrated alkanes include, but are not limited to, nitromethane, nitroethane, nitropropane, nitrobutane, nitropentane, nitrohexane, nitroheptane nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFC's blended with nitromethane.

The HFC is typically present at 1 to 100 volume % based upon the total volume of the diluents, alternatively between 5 and 100 volume %, alternatively between 10 and 100 volume %, alternatively between 15 and 100 volume %, alternatively between 20 and 100 volume %, alternatively between 25 and 100 volume %, alternatively between 30 and 100 volume %, alternatively between 35 and 100 volume %, alternatively between 40 and 100 volume %, alternatively between 45 and 100 volume %, alternatively between 50 and 100 volume %, alternatively between 55 and 100 volume %, alternatively between 60 and 100 volume %, alternatively between 65 and 100 volume %, alternatively between 70 and 100 volume %, alternatively between 75 and 100 volume %, alternatively between 80 and 100 volume %, alternatively between 85 and 100 volume %, alternatively between 90 and 100 volume %, alternatively between 95 and 100 volume %, alternatively between 97 and 100 volume %, alternatively between 98 and 100 volume %, and alternatively between 99 and 100 volume %. In a preferred embodiment the HFC is blended with one or more chlorinated hydrocarbons. In another preferred embodiment the HFC is selected from the group consisting of difluoromethane, trifluoromethane, 1,1-difluoroethane, 1,1,1-trifluoroethane, and 1,1,1,2-tetrafluoroethane and mixtures thereof.

In another embodiment the diluent or diluent mixture is selected based upon its solubility in the polymer. Certain diluents are soluble in the polymer. Preferred diluents have little to no solubility in the polymer. Solubility in the polymer is measured by forming the polymer into a film of thickness between 50 and 100 microns, then soaking it in diluent (enough to cover the film) for 4 hours at −75° C. The film is removed from the diluent, exposed to room temperature for 90 seconds to evaporate excess diluent from the surface of the film, and weighed. The mass uptake is defined as the percentage increase in the film weight after soaking. The diluent or diluent mixture is chosen so that the polymer has a mass uptake of less than 4 wt %, preferably less than 3 wt %, preferably less than 2 wt %, preferably less than 1 wt %, more preferably less than 0.5 wt %.

In a preferred embodiment, the diluent or diluent mixture is selected such that the difference between the measured glass transition temperature Tg of the polymer with less than 0.1 wt % of any diluent, unreacted monomers and additives is within 15° C. of the Tg of the polymer measured after it has been formed into a film of thickness between 50 and 100 microns, that has been soaked in diluent (enough to cover the film) for 4 hours at −75° C. The glass transition temperature is determined by differential scanning calorimetry (DSC). Techniques are well described in the literature, for example, B. Wunderlich, "The Nature of the Glass Transition and its Determination by Thermal Analysis", in *Assignment of the Glass Transition*, ASTM STP 1249, R. J. Seyler, Ed., American Society for Testing and Materials, Philadelphia, 1994, pp. 17-31. The sample is prepared as described above, sealed immediately after soaking into a DSC sample pan, and maintained at a temperature below −80° C. until immediately before the DSC measurement. Preferably the Tg values are within 12° C. of each other, preferably within 11° C. of each other, preferably within 10° C. of each other, preferably within 9° C. of each other, preferably within 8° C. of each other, preferably within 7° C. of each other, preferably within 6> C. of each other, preferably within 5° C. of each other, preferably within 4° C. of each other, preferably within 3° C. of each other, preferably within 3° C. of each other, preferably within 2° C. of each other, preferably within 1° C. of each other.

Polymerization Process

The invention may be practiced in continuous, semi-continuous or batch processes. Further the invention may be practiced in a plug flow reactor and/or stirred tank reactor where the contact time of the monomer and catalyst streams include but are not limited to from less than 30 s, alternatively, from less than 20 s, alternatively, from less than 15 s, alternatively from less than 12 s, alternatively, from less than 10 s, alternatively, from less than 8 s, alternatively, from less than 5, alternatively from less than 3 s, alternatively, from less than 1 s, alternatively, from less than 0.1 s, alternatively, from less than 0.01 s and alternatively from less than 0.001 s.

In particular this invention may be practiced in "butyl reactors." Illustrative examples include any reactor selected from the group consisting of a continuous flow stirred tank reactor, a plug flow reactor, a moving belt or drum reactor, a jet or nozzle reactor, a tubular reactor, and an autorefrigerated boiling-pool reactor.

In an embodiment, one or more hydrofluorocarbon(s) are used in polymerization processes having reaction rates with short contact times in turbulent flow reactor systems. In certain embodiments, the system proceeds in accordance with the drawings. In particular, in FIG. 1 an injection head is provided. The injection head of the experimental set-up comprises two injection nozzles 3, 5 separated by angle 7. Both nozzles are attached to a suitable, stable support structure 9, 11 capable of retaining the predetermined angle 7. The injections nozzles provide for feeding streams of monomer and catalyst system or catalyst system components to the reactor head and to provide an impinging flow 1 of these streams upon one another to form the reaction stream.

In an embodiment, one or more hydrofluorocarbon(s) are used in polymerization processes having reaction rates with short contact times in turbulent flow reactor systems. In certain embodiments, the system proceeds in accordance with the drawings. In particular, in FIG. 1 an injection head is provided. The injection head of the experimental set-up comprises two injection nozzles 3, 5 separated by angle 7. Both nozzles are attached to a suitable, stable support structure 9, 11 capable of retaining the predetermined angle 7. The injections nozzles provide for feeding streams of monomer and catalyst system or catalyst system components to the reactor head and to provide an impinging flow 1 of these streams upon one another to form the reaction stream.

Figure 1:
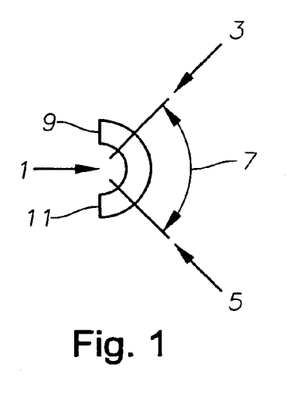
FIG. 1 is a drawing of a design of an injection head device.

The angle 7 between the nozzles can be set to maximize the local turbulence and mixing depending upon the flow velocities and nozzle diameters used in the reactor. The angle can be of any value that causes the streams to impinge upon each other including 1 or 2 degrees of separation to 180 degrees of separation where the flows of feeds directly oppose each other. In an embodiment, the angle of separation is from about 20 to about 160 degrees and, alternatively, from about 30 to about 120 degrees.

Nozzles suitable for the reactor system should provide for a flow velocity of the monomer and catalyst feed streams that may be sufficient to create a spray of microdroplets around the impinging point of the streams. In certain embodiments, the microdroplets result, in part, from the high local turbulence and intense mixing. While the formation of microdroplets may be desirable, it is not necessarily a requirement.

The flow velocity is the ratio of the fluid flow rate, expressed as volume per unit time, to the cross-sectional area of the nozzle, expressed in units of length squared. Flow velocities useful for this invention include, but are not limited to from about 0.5 to about 400 m/s in one embodiment, alternatively, from about 1 to about 100 m/s, alternatively, from about 1 to about 50 m/s, and alternatively, from about 1 to about 20 m/s in another embodiment.

In the examples, a design scaled for the convenience of laboratory work, useful nozzles have internal diameters that range from 0.1 to 0.8 mm using catalyst and monomer feed flow rates of 20 to 200 ml/min. The selection of nozzle diameters and feed flow rates are made to maintain average flow velocities of from about 1 to about 400 m/s. The adaptation of these scales for commercial and/or large-scale production is well within the skill the art in light of the teaching provided herein.

Figure 2:
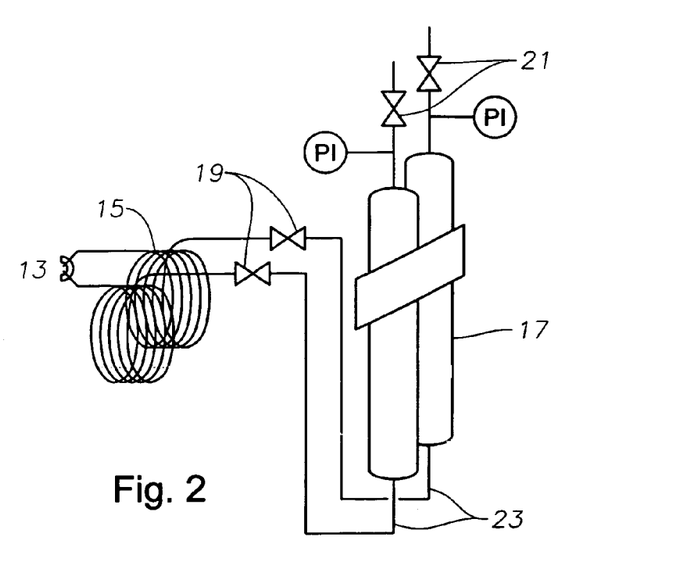
FIG. 2 is a schematic of a reactor system.

In reference to FIG. 2, an embodiment of a turbulent reactor system is provided. The monomer and catalyst feeds are provided to the injector head 13 through transfer lines 23 control valves 19 to control the flow of the feeds and cooling loops 15 to cool the feeds from pressurized storage reservoirs 17 where the feeds are stored. Pressure is maintained at a predetermined head pressure by admitting an inert gas, such as nitrogen, through valves 21. An embodiment of the assembly is employed in the Examples and described in more detail below and illustrated in FIG. 3.

In another embodiment, a converging/diverging flow path and/or a nozzle arrangement is used to provide for formation of impinging flows of the monomer and catalyst feeds to provide the necessary mixing intensity. If the reaction is exothermic, a means for removing heat of reaction must also be provided (by sub-cooling the reactants below the desired reaction temperature and/or by heat removal via sensible heat transfer through the reactor shell or by evaporative heat transfer where the reaction medium is partially evaporated within the reactor).

The overall contact time in the reactor can vary, depending upon, e.g., catalyst activity and concentration, monomer concentration, feed injection rate, production rate, reaction temperature, and desired molecular weight, and generally will be between about a few microseconds and tens of seconds, and typically between 0.001 and 30 seconds. Variables influencing contact time include the monomer and diluent feed injection rates and the overall reactor volume.

for background information and general principles, see, e.g., GB 2 181 145 A, Berlin et al., *The Macroscopic Kinetics of Rapid Processes of Polymerization in Turbulent Flows*, Polym.-Plast. Technol. Eng., 30(2 & 3), 253-297 (1991), Minsker et al., *Plug-Flow Tubular Turbulent Reactors: A New Type of Industrial Apparatus*, Theoretical Foundations of Chemical Engineering, Vol. 35, No. 2, 162-167 (2001), and U.S. Pat. No. 5,397,179.

As discussed in the BACKGROUND, past teachings present many challenges for implementation of such polymerization processes and reactor system designs. However, polymerization processes and reactor system systems utilizing diluents comprising HFCs described herein present at least one or several benefits.

For example, isobutylene polymerizations take place at extremely high rates in polar hydrofluorocarbons and therefore are able to generate the desired molecular weight polymer within a very short reaction time, generally within seconds. Additionally, the overall reaction rate for isobutylene polymerization in hydrofluorocarbons is much faster than in methyl chloride (MeCl), therefore, improving the effectiveness (monomer conversion and yield) of the reactor.

Selection of the particular hydrofluorocarbon, or mixture of hydrofluorocarbons and monomers allow the evaporation temperature of the polymerizing mixture to be tailored. Such evaporation of the hydrofluorocarbon mixture during the course of polymerization allows efficient removal of the heat of polymerization and allows control of the reaction temperature. The composition of the polymerizing mixture, the local pressure, and the extent of polymerization locally all affect the local temperature in the reactor. Selection of a hydrofluorocarbon that is much more volatile than the reactant monomers allows the hydrofluorocarbon diluents to evaporate during the reaction, remove the reaction heat, but without carrying away a large fraction of the isobutylene and comonomers.

Moreover, isobutylene polymer slurries made in hydrofluorocarbons have been found to be non-fouling likely due to less swelling of the polymer in the monomers and diluent (compared to MeCl). Therefore, the tendency for reactor fouling is diminished and therefore good mixing and stable polymerization hydrodynamics is maintained for the reactor system.

In certain embodiments, the invention is practiced using a slurry polymerization process. The polymerization processes of the invention may be cationic polymerization processes.

In certain embodiments, the polymerization is carried out where the catalyst, monomer, and diluent are present in a single phase. Preferably, the polymerization is carried-out in a continuous polymerization process in which the catalyst, monomer(s), and diluent are present as a single phase. In slurry polymerization, the monomers, catalyst(s), and initiator(s) are all miscible in the diluent or diluent mixture, i.e., constitute a single phase, while the polymer precipitates from the diluent with good separation from the diluent. Desirably, reduced or no polymer "swelling" is exhibited as indicated by little or no Tg suppression of the polymer and/or little or no diluent mass uptake. Thus, polymerization in the diluents of the present invention provides for high polymer. concentration to be handled at low viscosity with good heat transfer, reduced reactor fouling, homogeneous polymerization and/or the convenience of subsequent reactions to be run directly on the resulting polymer mixture.

The reacted monomers within the reactor or microdroplet form part of a slurry. In one embodiment, the concentration of the solids in the slurry is equal to or greater than 10 vol %. In another embodiment, the concentration of solids in the slurry is present in the reactor equal to or greater than 25 vol %. In yet another embodiment, the concentration of solids in the slurry is less than or equal to 75 vol %. In yet another embodiment, the concentration of solids in slurry is present in the reactor from 1 to 70 vol %. In yet another embodiment, the concentration of solids in slurry is present in the reactor from 5 to 70 vol %. In yet another embodiment, the concentration of solids in slurry concentration is present in the reactor from 10 to 70 vol %. In yet another embodiment, the concentration of solids in slurry concentration is present in the reactor from 15 to 70 vol %. In yet another embodiment, the concentration of solids in slurry concentration is present in the reactor from 20 to 70 vol %. In yet another embodiment, the concentration of solids in slurry concentration is present in the reactor from 25 to 70 vol %. In yet another embodiment, the concentration of solids in slurry concentration is present in the reactor from 30 to 70 vol %. In yet another embodiment, the concentration of solids in slurry concentration is present in the reactor from 40 to 70 vol %.

In some embodiments, the feed-stream is substantially free from silica cation producing species. By substantially free of silica cation producing species, it is meant that there is no more than 0.0005 wt % based on the total weight of the monomers of these silica cation producing species in the feed stream. Typical examples of silica cation producing species are halo-alkyl silica compounds having the formula $R_1R_2R_3SiX$ or $R_1R_2SiX_2$, etc., wherein "R" is an alkyl and "X" is a halogen. The reaction conditions will be such that desirable temperature, pressure and residence time are effective to maintain the reaction medium in the liquid state and to produce the desired polymers having the desired characteristics. The monomer feed-stream is typically substantially free of any impurity which is adversely reactive with the catalyst under the polymerization conditions. For example, In some embodiments, the monomer feed preferably should be substantially free of bases (such as caustic), sulfur-containing compounds (such as $H_2S$, COS, and organo-mercaptans, e.g., methyl mercaptan, ethyl mercaptan), nitrogen-containing bases, oxygen containing bases such as alcohols and the like. However monomer feed may be less pure, typically not less than 95% based on total olefinic content, more preferably not less than 98%, not less than 99%. In preferred embodiments the impurities are present at less than 10,000 ppm (by weight), preferably less that 500 ppm, preferably less than 250 ppm, preferably less than 150 ppm, preferably less than 100 ppm.

As is normally the case, reaction time, temperature, concentration, the nature of the reactants, and similar factors determine product molecular weights. The polymerization reaction temperature is conveniently selected based on the target polymer molecular weight and the monomer to be polymerized as well as standard process variable and economic considerations, e.g., rate, temperature control, etc. The temperature for the polymerization is less than 0° C., preferably between −10° C. and the freezing point of the slurry in one embodiment, and from −25° C. to −120° C. in another embodiment. In yet another embodiment, the polymerization temperature is from −40° C. to −100° C., and from −70° C. to −100° C. in yet another embodiment. In yet another desirable embodiment, the temperature range is from −80° C. to −100° C. Consequently, different reaction conditions will produce products of different molecular weights. Synthesis of the desired reaction product may be achieved, therefore, through monitoring the course of the reaction by the examination of samples taken periodically during the reaction; a technique widely employed in the art.

In a preferred embodiment, the polymerization temperature is within 10° C. above the freezing point of the diluent, preferably within 8° C. above the freezing point of the diluent, preferably within 6° C. above the freezing point of the diluent, preferably within 4° C. above the freezing point of the diluent, preferably within 2° C. above the freezing point of the diluent, preferably within 1° C. above the freezing point of the diluent. For the purposes of this invention and the claims thereto when the phrase "within X° C. above the freezing point of the diluent" is used it means the freezing point of the diluent plus X° C. For example if the freezing point of the diluent is −98° C., then 10° C. above the freezing point of the diluent is −88° C.

The reaction pressure will be from above 0 to 14,000 kPa in one embodiment (where 0 kPa is a total vacuum), from 7 kPa to 12,000 kPa in another embodiment, from 100 kPa to 2000 kPa in another embodiment, from 200 kPa to 1500 kPa in another embodiment, from 200 kPa to 1200 kPa in another embodiment, and from 200 kPa to 1000 kPa in yet another embodiment, from 7 kPa to 100 kPa in another embodiment, from 20 kPa to 70 kPa in another embodiment, from 40 kPa to 60 kPa in yet another embodiment, from 1000 kPa to 14,000 kPa in another embodiment, from 3000 kPa to 10,000 kPa in another embodiment, and from 3,000 kPa to 6,000 kPa in yet another embodiment.

The order of contacting the monomer feed-stream, catalyst, initiator, and diluent may vary from one embodiment to another.

In another embodiment, the initiator and Lewis acid are pre-complexed by mixing together in the selected diluent for a prescribed amount of time ranging from 0.01 second to 10 hours, and then is injected into the continuous reactor through a catalyst nozzle or injection apparatus. In yet another embodiment, Lewis acid and the initiator are added to the reactor separately. In another embodiment, the initiator is blended with the feed monomers before injection to the reactor. Desirably, the monomer is not contacted with the Lewis acid, or the Lewis acid combined with the initiator before the monomers enter the reactor.

In an embodiment of the invention, the initiator and Lewis acid are allowed to pre-complex or pre-contact each other by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In another embodiment of the invention, the initiator and Lewis acid are allowed to pre-complex by mixing together in the selected diluent at temperatures between 80 and −150° C., typically between −40° C. and −98° C.

The catalyst (Lewis acid) to monomer ratio utilized will be those conventional in this art for carbocationic polymerization processes. In one embodiment of the invention, the monomer to catalyst mole ratios will typically be from 500 to 10000, and in the range of 2000 to 6500 in another embodiment. In yet another desirable embodiment, the ratio of Lewis acid to initiator is from 0.5 to 10, or from 0.75 to 8. The overall concentration of the initiator in the reactor is typically from 5 to 300 ppm or 10 to 250 ppm. The concentration of the initiator in the catalyst feed stream is typically from 50 to 3000 ppm in one embodiment. Another way to describe the amount of initiator in the reactor is by its amount relative to the polymer. In one embodiment, there is from 0.25 to 20 moles polymer/mole initiator, and from 0.5 to 12 mole polymer/mole initiator in another embodiment.

The reactor will contain sufficient amounts of the catalyst system of the present invention to catalyze the polymerization of the monomer containing feed-stream such that a sufficient amount of polymer having desired characteristics is produced. The feed-stream in one embodiment contains a total monomer concentration greater than 20 wt % (based on the total weight of the monomers, diluent, and catalyst system), greater than 25 wt % in another embodiment. In yet another embodiment, the feed-stream will contain from 30 wt % to 50 wt % monomer concentration based on the total weight of monomer, diluent, and catalyst system.

Catalyst efficiency (based on Lewis acid) in the reactor is maintained between 10,000 pounds of polymer per pound of catalyst and pounds of polymer per pound of catalyst and desirably in the range of 4000 pounds of polymer per pound of catalyst to 1000 pounds of polymer per pound of catalyst by controlling the molar ratio of Lewis acid to initiator.

INDUSTRIAL APPLICATIONS

The polymers of the invention provide chemical and physical characteristics that make them highly useful in wide variety of applications. The low degree of permeability to gases accounts for the largest uses of these polymers, namely inner tubes and tire innerliners. These same properties are also of importance in air cushions, pneumatic springs, air bellows, accumulator bags, and pharmaceutical closures. The thermal stability of the polymers of the invention make them ideal for rubber tire-curing bladders, high temperature service hoses, and conveyor belts for hot material handling.

The polymers exhibit high damping and have uniquely broad damping and shock absorption ranges in both temperature and frequency. They are useful in molded rubber parts and find wide applications in automobile suspension bumpers, auto exhaust hangers, and body mounts.

The polymers of the instant invention are also useful in tire sidewalls and tread compounds. In sidewalls, the polymer characteristics impart good ozone resistance, crack cut growth, and appearance. The polymers of the invention may also be blended. Properly formulated blends with high diene rubbers that exhibit phase co-continuity yield excellent sidewalls. Improvements in wet, snow, and ice skid resistances and in dry traction without compromises in abrasion resistance and rolling resistance for high performance tires can be accomplished by using the polymers of the instant invention.

Blends of the polymers of the invention with thermoplastic resins are used for toughening of these compounds. High-density polyethylene and isotactic polypropylene are often modified with 5 to 30 wt % of polyisobutylene. In certain applications, the instant polymers provide for a highly elastic compound that is processable in thermoplastic molding equipment. The polymers of the instant invention may also be blended with polyamides to produce other industrial applications.

The polymers of the instant invention may also be used as adhesives, caulks, sealants, and glazing compounds. They are also useful as plasticizers in rubber formulations with butyl, SBR, and natural rubber. In linear low density polyethylene (LLDPE) blends, they induce cling to stretch-wrap films. They are also widely employed in lubricants as dispersants and in potting and electrical cable filling materials.

In certain applications, the polymers of the invention make them also useful in chewing-gum, as well as in medical applications such as pharmaceutical stoppers, and the arts for paint rollers.

The following examples reflect embodiments of the invention and are by no means intended to be limiting of the scope of the invention.

EXAMPLES

Injection Head

Injection nozzles (FIG. 1) were ordered from Valco Instrument Co. Inc. and used directly. The nozzles are pre-cut 1/16" stainless steel tubing, 5 cm in length with an internal diameter of 0.02 inches. Two nozzles of the same internal diameter were fixed on a piece of metal oriented 90° from each other.

Reactor Design

There are 4 parts for the reactor (FIG. 2): I. Vessels for chemicals storage 17 (monomer and catalyst feeds): Vessels were ordered from Baytown Valve & Fitting and used directly. The vessels are Swagelok 304L Stainless Steel 300-ml sample cylinders. II. 1/4" tubing for chemical transfer 23: 1/4"×0.049" stainless steel tubing. III. 1/16" cooling coils 15 for cooling feeds before entering the Injection head: tubing for cooling coils were ordered from Valco Instrument Co. Inc. and bent as a coil in the lab. These are pre-cut 1/16" stainless steel tubing in 100 cm length with 0.040 inches internal diameter. IV. Injection head for chemical mixing 13 (see FIG. 1).

Experimental Set Up

Figure 3:
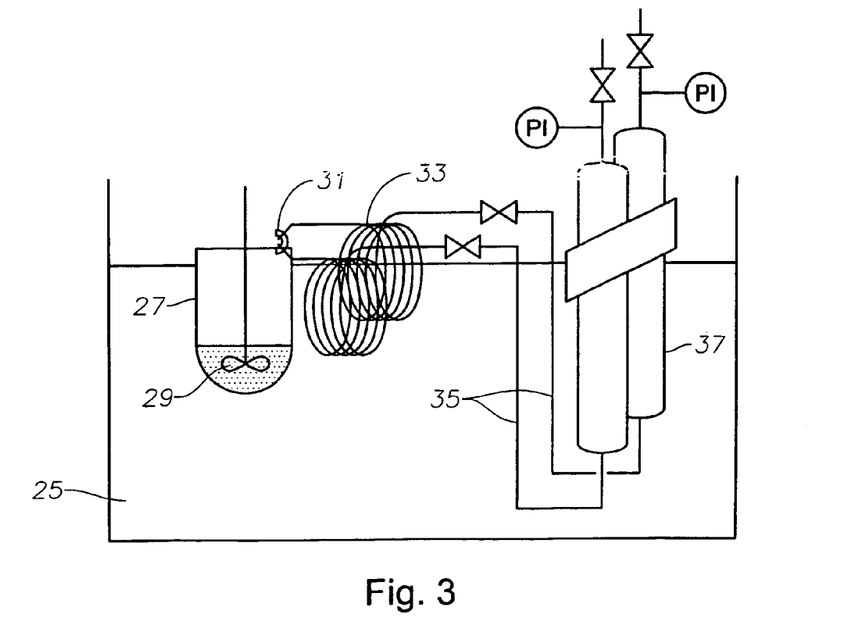
FIG. 3 is a schematic of the experimental set-up described in the Examples.

The entire experimental set up is shown on FIG. 3. The temperature of the monomer and catalyst feeds were controlled by immersing the whole reactor into a cold bath 25 at the desired temperature. Vessels 37 of monomer and catalyst were supplied as feeds to the reactor via tubing 35. The feeds were cooled with the use of cooling coils 33 submerged in the cold bath 25. The reactor was set into the cold bath for 15 to 20 min to reach the bath temperature before mixing. A 500 ml glass vessel 27 with 30ml of 2-propanol was placed in cold bath 25 after the injection head 31 for quenching the polymerization and collecting polymer. A mechanical stirrer 29 is placed in the glass vessel 27 for better mixing.

Chemicals

Solvents

Methyl chloride liquid was passed through a molecular sieve column and a silica gel column then dried with TEAL (triethylaluminum) and distilled before used. TEAL was ordered from Akzo Nobel and used directly.

Methylene chloride was ordered from Aldrich, dried with $CaH_2$ and distilled before used. $CaH_2$ was ordered from Aldrich and used directly.

1,1,1,2-Tetrafluoroethane liquid was used directly without any purification.

Difluoromethane was ordered from SynQuest Laboratories, Incorporated. Difluoromethane liquid was used directly without any purification for some experiments. For comparison, in some of experiments the difluoromethane was dried with TEAL and distilled.

Monomers

Isobutylene gas was from the ExxonMobil Chemical Plant in Baytown, Tex. and was passed through a drying column before used. Isoprene was ordered from Aldrich and vacuum-distilled before used.

Catalyst

A 20 wt % stock solution of catalyst was prepared in the lab by mixing neat ethylaluminum dichloride with ULB hexane. Ethylaluminum dichloride was ordered from Akzo Nobel and used directly. ULB hexane from ExxonMobil was predried with 4 Å molecular sieve before used.

Cocatalyst

TMPCl (2-chloro-2,4,4-trimethylpentane) was prepared by hydrochlorination of isobutylene dimer and dried with $CaH_2$ and vacuum distilled before used. HCl was predissolved in the desired solvent at constant temperature and used directly. The concentration of HCl in the solvent was determined by titration.

For all experiments, the procedure was as follows: The reactor was set in the cold bath at the desired temperature. Isobutylene and isoprene were mixed with the clean solvent in a 250-ml graduated cylinder at the desired temperature. The total volume of monomer solution was approximately 150-ml. The mixed monomer solution was transferred into a 300-ml monomer vessel. The stock HCl solution was diluted with 250-ml of cleaned solvent and activated with 20 wt % EADC/ULB hexane. The activated catalyst was transferred into another 300-ml vessel. Both vessels were pressurized with between 690 and 795 kPa of $N_2$ gas throughout the reaction. To a prechilled 2-neck 500-ml round bottom flask, 25-ml 2-propanol was added and the flask was immersed in the cold bath for polymerization quench and polymer collection.

The injection head was placed on the top of the round bottom flask. A mechanical stirrer was used in the collector for better mixing of the quench with the prepared polymer. The reaction was started by starting the stream of activated catalyst first, followed by starting the monomer solution. The chemical streams exited the injection nozzles at a high flow rate and mixed in the cross section forming very fine liquid droplets. Within the fine droplets of liquid polymerization takes place. Polymerization continues until the droplets reach the 2-propanol in collector. The polymerization would stop by mixing the droplets with 2-propanol. The time of polymerization for each droplet is less than a second. Polymerization was continued until both vessels emptied. The total reaction time for each experiment was approximately 2 min. Polymers were dried in a vacuum oven and permitted calculated of the conversion of each polymerization. Molecular weight of the polymer was checked by GPC.

Methyl Chloride (MeCl)

Polymerizations were attempted in methyl chloride using HCl as an initiator for the purposes of comparative examples. Due to the low residence time, no polymer was formed using methyl chloride as a solvent.

Methylene Chloride ($CH_2Cl_2$)

The experimental procedure was modified for methylene chloride experiments. Instead of loading preactivated catalyst into the catalyst vessel, TMPCl was added into the monomer solution and loaded into the monomer vessel before reaction. Polymerization in methylene chloride was also different from other solvents, because the polymer dissolved into the solvent. Polymerizations in methylene chloride behaved more like solution polymerizations rather than slurry polymerizations. Polymerizations in methyl chloride are comparative examples.

1,1,1,2-tetrafluoroethane ($CH_2FCF_3$)

Polymer formed immediately after mixing and stayed in a slurry after quenching with 2-propanol.

Difluoromethane ($CH_2F_2$)

Polymer formed immediately after mixing and stayed in a slurry after quenching with 2-propanol.

Table 1 lists the results of polymerizations conducted in a 10 wt % monomer concentration with different solvents at −95° C. HCl was used as an initiator in examples 1, 2 and 3. Examples 1, 2 and 3 are examples of the current invention. TMPCl (2-chloro-2,4,4-trimethylpentane) was used as the initiator for example 4. Example 4 is a comparative example.

TABLE 1

| Example | Diluent | Conversion (Wt. %) | $M_n \times 10^{-3}$ | $M_w \times 10^{-3}$ | $M_w/M_n$ | EADC/Initiator Mole Ratio |
|---|---|---|---|---|---|---|
| 1 | $CH_2FCF_3$ | 33.6 | 97 | 286 | 2.9 | 3.0 |
| 2 | $CH_2F_2$ | 20.4 | 55 | 217 | 3.9 | 3.0 |
| 3[a] | $CH_2F_2$ | 56.2 | 96 | 319 | 3.3 | 3.0 |
| 4[b] | $CH_2Cl_2$ | 31.4 | 10 | 17 | 1.7 | 3.0 |

[a] $CH_2F_2$ was dried with TEAL and distilled before used.
[b] $CH_2Cl_2$ was dried with $CaH_2$ and distilled before used.

Table 2 lists the results of polymerizations conducted in a 10 wt % of monomer concentration with different solvents at −55° C. HCl was used as an initiator in examples 5 and 6. Examples 5 and 6 are examples of the current invention. TMPCl (2-chloro-2,4,4-trimethylpentane) was used as an initiator for example 7. Example 7 is a comparative example.

TABLE 2

| Example | Diluent | Conversion (Wt. %) | $M_n \times 10^{-3}$ | $M_w \times 10^{-3}$ | $M_w/M_n$ | EADC/Initiator Mole Ratio |
|---|---|---|---|---|---|---|
| 5 | $CH_2FCF_3$ | 22.4 | 57 | 129 | 2.2 | 6.0 |
| 6 | $CH_2F_2$ | 5.7 | 45 | 107 | 2.4 | 6.0 |
| 7[a] | $CH_2Cl_2$ | 53.6 | 10 | 17 | 1.7 | 6.0 |

[a] $CH_2Cl_2$ was dried with $CaH_2$ and distilled before used.

Table 3 lists the results of polymerizations conducted in a 5 wt % of monomer concentration with different solvents at −95° C. HCl was used as an initiator in examples 8 and 9.

TABLE 3

| Example | Diluent | Conversion (Wt. %) | $M_n \times 10^{-3}$ | $M_w \times 10^{-3}$ | $M_w/M_n$ | EADC/Initiator Mole Ratio |
|---|---|---|---|---|---|---|
| 8 | $CH_2FCF_3$ | 70.3 | 83 | 221 | 2.7 | 3.0 |
| 9 | $CH_2F_2$ | 13.6 | 109 | 290 | 2.6 | 3.0 |

The examples above exemplify certain embodiments of the instant invention. Polymerization in the hydrofluorocarbon is rapid enough to provide both reasonable conversion and molecular weight of the prepared polymer. Polymerizations using the chlorohydrocarbons were either not possible, i.e. no reaction under comparable reaction conditions, or when conversion to polymer was achieved, the molecular weights of the prepared products were significantly lower than comparable reactions in the hydrofluorocarbon.

All patents and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A polymerization process comprising contacting at least one first feed stream and at least one second feed stream at a contact time of about 30 seconds or less, the polymerization process being a cationic polymerization process comprising the use of a diluent comprising one or more hydrofluorocarbon(s) (HFC) in a reactor system.

2. The polymerization process of claim 1, wherein the at least one first feed stream comprises a catalyst system or catalyst system components and the at least one second feed stream comprises one or more monomer(s).

3. The polymerization process of claim 2, wherein the catalyst system components comprise one or more Lewis acid(s) or one or more initiator(s).

4. The polymerization process of claim 1, wherein the polymerization process comprises one or more Lewis acid(s) independently selected from the group consisting of titanium tetrachloride, titanium tetrabromide, vanadium tetrachloride, tin tetrachloride, zirconium tetrachloride, titanium bromide trichloride, titanium dibromide dichloride, vanadium bromide trichloride, tin chloride trifluoride, benzyltitanium trichloride, dibenzyltitanium dichloride, benzylzirconium trichloride, dibenzylzirconium dibromide, methyltitanium trichloride, dimethyltitanium difluoride, dimethyltin dichloride, phenylvanadium trichloride, methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride, benzyl isopropoxyvanadium dichloride, acetoxytitanium trichloride, benzoylzirconium tribromide, benzoyloxytitanium trifluoride, isopropoyloxytin trichloride, methyl acetoxytitanium dichloride, benzyl benzoyloxyvanadium chloride, vanadium oxytrichloride, aluminum trichloride, boron trifluoride, gallium trichloride, indium trifluoride, ethylaluminum dichloride, methylaluminum dichloride, benzylaluminum dichloride, isobutylgallium dichloride, diethylaluminum chloride, dimethylaluminum chloride, ethylaluminum sesquichloride, methylaluminum sesquichloride, trimethylaluminum, triethylaluminum, methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride, phenoxy methylindium fluoride, acetoxyaluminum dichloride, benzoyloxyaluminum dibromide, benzoyloxygallium difluoride, methyl acetoxyaluminum chloride, isopropoyloxyindium trichloride, antimony hexachloride, antimony hexafluoride, arsenic pentafluoride, antimony chloride pentafluoride, arsenic trifluoride, bismuth trichloride arsenic fluoride tetrachloride, tetraphenylantimony chloride, triphenylantimony dichloride, tetrachloromethoxyantimony, dimethoxytrichloroantimony, dichloromethoxyarsine, chlorodimethoxyarsine, difluoromethoxyarsine, acetatotetrachloroantimony, (benzoato) tetrachloroantimony, aluminum tribromide, and bismuth acetate chloride.

5. The polymerization process of claim 1, wherein the polymerization process comprises one or more initiator(s) comprising a hydrogen halide, a carboxylic acid, a carboxylic acid halide, a sulfonic acid, an alcohol, a phenol, a polymeric halide, a tertiary alkyl halide, a tertiary aralkyl halide, a tertiary alkyl ester, a tertiary aralkyl ester, a tertiary alkyl ether, a tertiary aralkyl ether, an alkyl halide, an aryl halide, an alkylaryl halide, H2O, or an arylalkylacid halide.

6. The polymerization process of claim 1, wherein the polymerization process comprises one or more initiator(s) comprising a weakly-coordinating anion.

7. The polymerization process of claim 1, wherein the polymerization process is substantially free of water.

8. The polymerization process of claim 1, wherein the polymerization process comprises 30 ppm water or greater (based upon weight).

9. The polymerization process of claim 1, wherein the polymerization process comprises one or more hydrofluorocarbon(s) represented by the formula: $C_xH_yF_z$ wherein x is an integer from 1 to 40 and y and z are integers of one or more.

10. The polymerization process of claim 1, wherein the diluent comprises from 15 to 100 volume % HFC based upon the total volume of the diluent.

11. The polymerization process of claim 1, wherein the diluent further comprises a hydrocarbon, a non-reactive olefin, and/or an inert gas.

12. The polymerization process of claim 11, wherein the hydrocarbon is a halogenated hydrocarbon other than an HFC.

13. The polymerization process of claim 12, wherein the halogenated hydrocarbon is methyl chloride.

14. The polymerization process of claim 1, the diluent comprising methyl chloride and one or more hydrofluorocarbon(s) independently selected from the group consisting of difluoromethane, 1,1-difluoroethane, and 1,1,1,2-tetrafluoroethane.

15. The polymerization process of claim 1, wherein the polymerization process comprises one or more monomer(s) independently selected from the group consisting of olefins, alpha-olefins, disubstituted olefins, isoolefins, conjugated dienes, non-conjugated dienes, styrenics, substituted styrenics, vinyl ethers, and mixtures thereof.

16. The polymerization process of claim 1, wherein the flow velocity is from about 0.5 to about 400 m/s.

17. The polymerization process of claim 1, wherein the polymerization process utilizes a reactor system comprises at least one device to store a catalyst system or catalyst system components; at least one device to store one or more monomer(s); at least one device to cool the catalyst system and/or the catalyst system components and the one or more monomer(s), and at least one injection head.

18. The polymerization process of claim 1, wherein the polymerization process is a slurry polymerization process.

19. The polymerization process of claim 1, wherein the polymerization process is a continuous polymerization process.

20. The polymerization process of claim 1, wherein the polymerization process is a polymerization process for the polymerization of isobutylene-based polymers.

21. A polymerization process comprising contacting a catalyst system and one or monomer(s) at a contact time of about 30 seconds or less in a microdroplet of a polymerization medium, the polymerization medium comprising a diluent comprising one or more hydrofluorocarbon(s) (HFC).

22. The polymerization process of claim 21, wherein the microdroplet has a diameter of from about 0.4 to about 1000 microns.

23. The polymerization process of claim 21, wherein the catalyst system components comprise one or more Lewis acid(s) or one or more initiator(s).

24. The polymerization process of claim 21, wherein the polymerization process comprises one or more Lewis acid(s) independently selected from the group consisting of titanium tetrachloride, titanium tetrabromide, vanadium tetrachloride, tin tetrachloride, zirconium tetrachloride, titanium bromide trichloride, titanium dibromide dichloride, vanadium bromide trichloride, tin chloride trifluoride, benzyltitanium trichloride, dibenzyltitanium dichloride, benzylzirconium trichloride, dibenzylzirconium dibromide, methyltitanium trichloride, dimethyltitanium difluoride, dimethyltin dichloride, phenylvanadium trichloride, methoxytitanium trichloride, n-butoxytitanium trichloride, di(isopropoxy)titanium dichloride, phenoxytitanium tribromide, phenylmethoxyzirconium trifluoride, methyl methoxytitanium dichloride, methyl methoxytin dichloride, benzyl isopropoxyvanadium dichloride, acetoxytitanium trichloride, benzoylzirconium tribromide, benzoyloxytitanium trifluoride, isopropoyloxytin trichloride, methyl acetoxytitanium dichloride, benzyl benzoyloxyvanadium chloride, vanadium oxytrichloride, aluminum trichloride, boron trifluoride, gallium trichloride, indium trifluoride, ethylaluminum dichloride, methylaluminum dichloride, benzylaluminum dichloride, isobutylgallium dichloride, diethylaluminum chloride, dimethylaluminum chloride, ethylaluminum sesquichloride, methylaluminum sesquichloride, trimethylaluminum, triethylaluminum, methoxyaluminum dichloride, ethoxyaluminum dichloride, 2,6-di-tert-butylphenoxyaluminum dichloride, methoxy methylaluminum chloride, 2,6-di-tert-butylphenoxy methylaluminum chloride, isopropoxygallium dichloride, phenoxy methylindium fluoride, acetoxyaluminum dichloride, benzoyloxyaluminum dibromide, benzoyloxygallium difluoride, methyl acetoxyaluminum chloride, isopropoyloxyindium trichloride, antimony hexachloride, antimony hexafluoride, arsenic pentafluoride, antimony chloride pentafluoride, arsenic trifluoride, bismuth trichloride arsenic fluoride tetrachloride, tetraphenylantimony chloride, triphenylantimony dichloride, tetrachloromethoxyantimony, dimethoxytrichloroantimony, dichloromethoxyarsine, chlorodimethoxyarsine, difluoromethoxyarsine, acetatotetrachloroantimony, (benzoato) tetrachloroantimony, aluminum tribromide, and bismuth acetate chloride.

25. The polymerization process of claim 21, wherein the polymerization process comprises one or more initiator(s) comprising a hydrogen halide, a carboxylic acid, a carboxylic acid halide, a sulfonic acid, an alcohol, a phenol, a polymeric halide, a tertiary alkyl halide, a tertiary aralkyl halide, a tertiary alkyl ester, a tertiary aralkyl ester, a tertiary alkyl ether, a tertiary aralkyl ether, an alkyl halide, an aryl halide, an alkylaryl halide, H2O, or an arylalkylacid halide.

26. The polymerization process of claim 21, wherein the polymerization process comprises one or more initiator(s) comprising a weakly-coordinating anion.

27. The polymerization process of claim 21, wherein the polymerization process is substantially free of water.

28. The polymerization process of claim 21, wherein the polymerization process comprises 30 ppm water or greater (based upon weight).

29. The polymerization process of claim 21, wherein the polymerization process comprises one or more hydrofluorocarbon(s) represented by the formula: $C_xH_yF_z$ wherein x is an integer from 1 to 40 and y and z are integers of one or more.

30. The polymerization process of claim 21, wherein the diluent comprises from 15 to 100 volume % HFC based upon the total volume of the diluent.

31. The polymerization process of claim 21, wherein the diluent further comprises a hydrocarbon, a non-reactive olefin, and/or an inert gas.

32. The polymerization process of claim 31, wherein the hydrocarbon is a halogenated hydrocarbon other than an HFC.

33. The polymerization process of claim 32, wherein the halogenated hydrocarbon is methyl chloride.

34. The polymerization process of claim 21, the diluent comprising methyl chloride and one or more hydrofluorocarbon(s) independently selected from the group consisting of difluoromethane, 1,1-difluoroethane, and 1,1,1,2-tetrafluoroethane.

35. The polymerization process of claim 21, wherein the polymerization process comprises one or more monomer(s) independently selected from the group consisting of olefins, alpha-olefins, disubstituted olefins, isoolefins, conjugated dienes, non-conjugated dienes, styrenics, substituted styrenics, vinyl ethers, and mixtures thereof.

36. The polymerization process of claim 21, wherein the flow velocity is from about 0.5 to about 400 m/s.

37. The polymerization process of claim 21, wherein the polymerization process utilizes a reactor system comprises at least one device to store a catalyst system or catalyst system components; at least one device to store one or more monomer(s); at least one device to cool the catalyst system and/or the catalyst system components and the one or more monomer(s), and at least one injection head.

38. The polymerization process of claim 21, wherein the polymerization process is a slurry polymerization process.

39. The polymerization process of claim 21, wherein the polymerization process is a cationic polymerization process.

40. The polymerization process of claim 21, wherein the polymerization process is a continuous polymerization process.

41. The polymerization process of claim 21, wherein the polymerization process is a polymerization process for the polymerization of isobutylene-based polymers.

\* \* \* \* \*